Nov. 15, 1932.  E. L. BALLEW  1,888,106
RACING APPARATUS
Filed Dec. 29, 1928   3 Sheets-Sheet 1
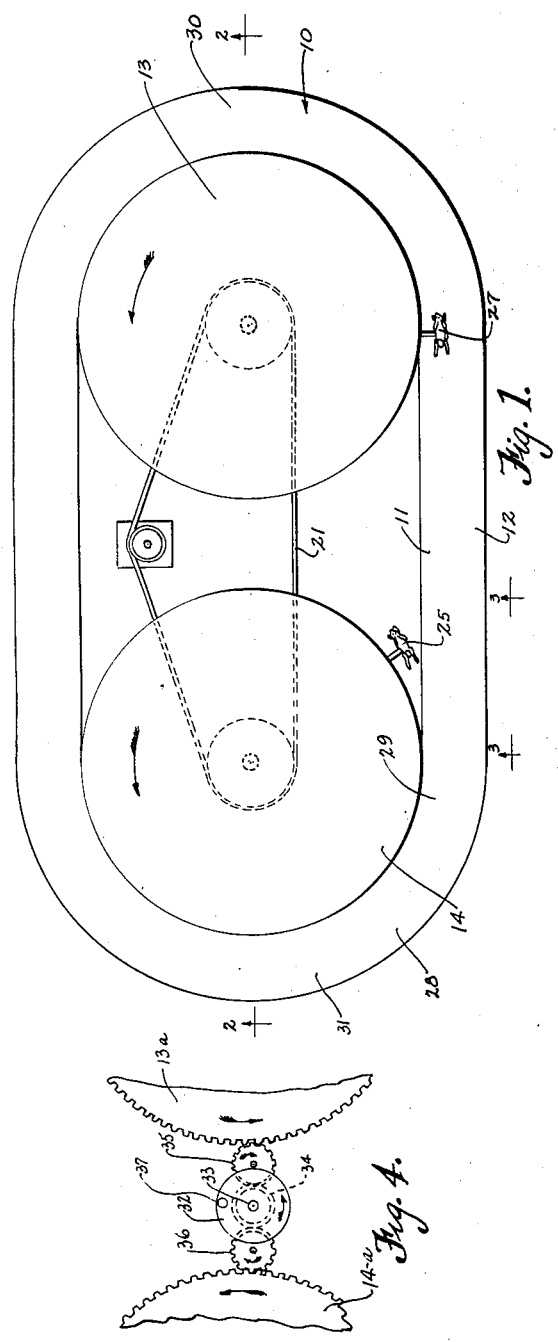
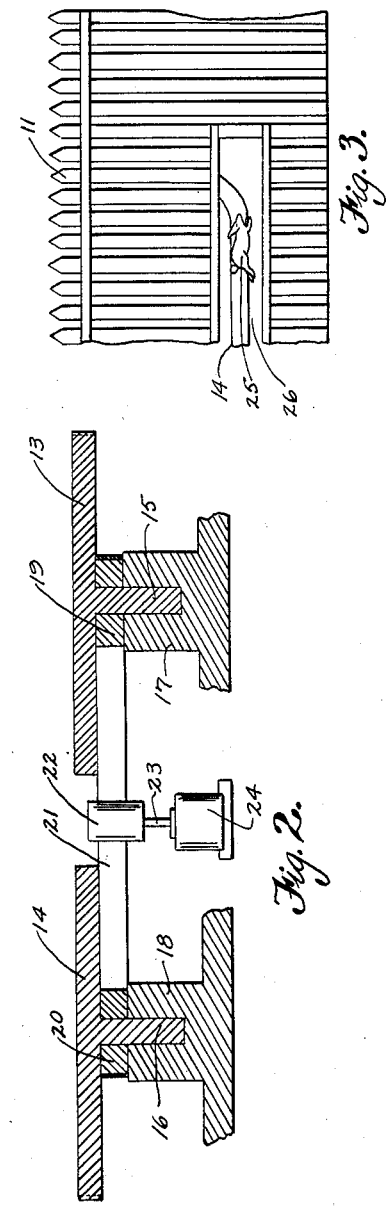
Elmer L. Ballew. INVENTOR
BY Victor J. Evans
ATTORNEY

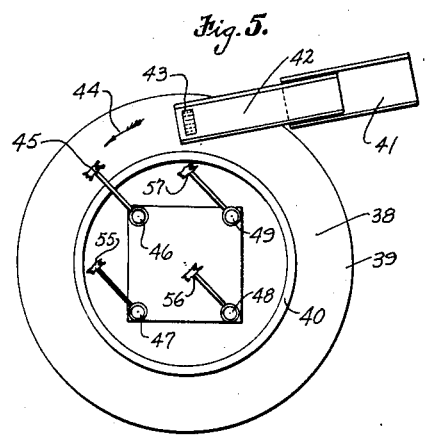

Nov. 15, 1932.  E. L. BALLEW  1,888,106
RACING APPARATUS
Filed Dec. 29, 1928  3 Sheets-Sheet 3
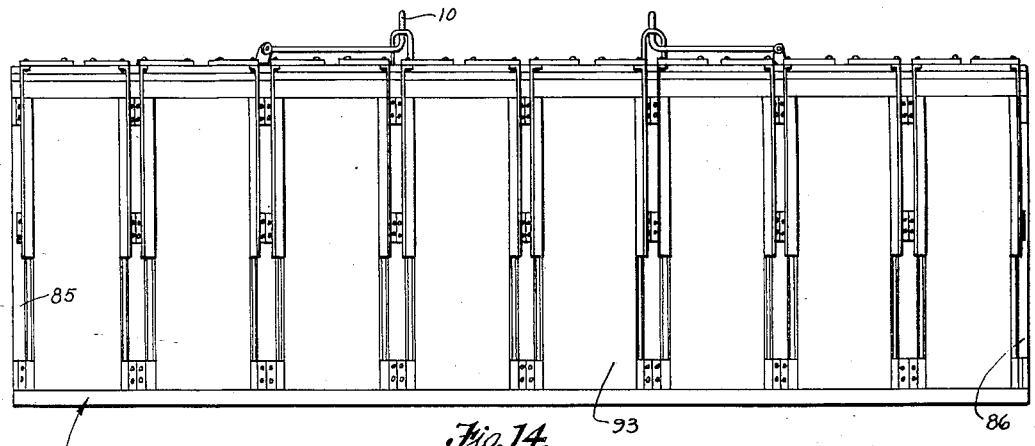
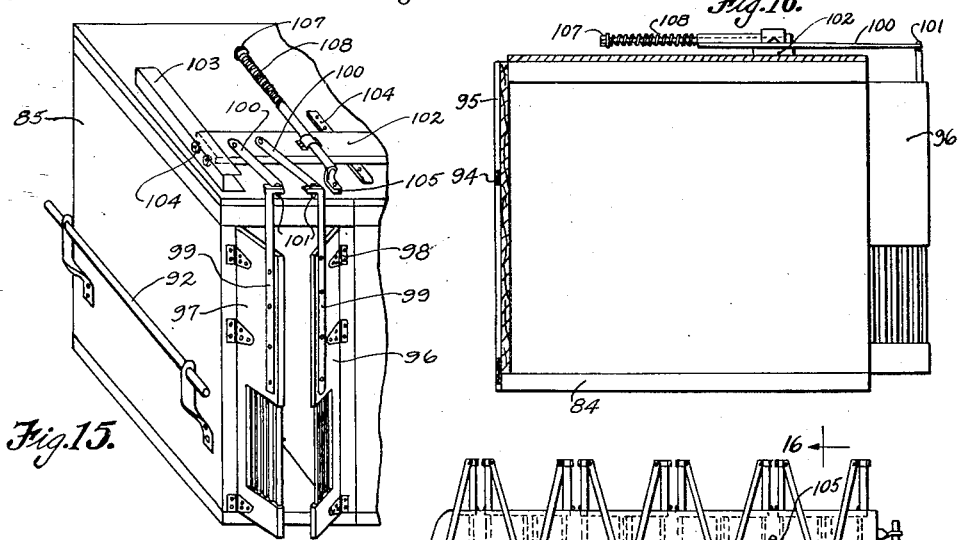
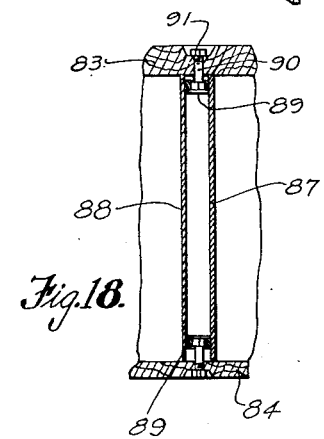
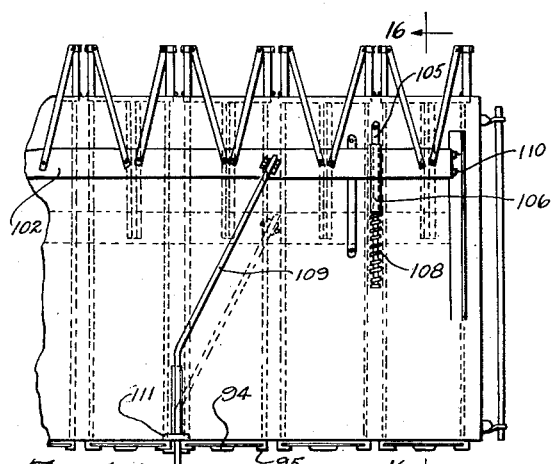
Elmer L. Ballew, INVENTOR
BY Victor J. Evans ATTORNEY Patented Nov. 15, 1932

1,888,106

UNITED STATES PATENT OFFICE

ELMER L. BALLEW, OF CHICAGO, ILLINOIS

RACING APPARATUS

Application filed December 29, 1928. Serial No. 329,112.

This invention relates to certain novel improvements in racing apparatus, and has for its principal object the provision of an improved construction of this character which will be highly efficient in use and economical in manufacture.

The salient object of my invention is to provide a racing apparatus which will be arranged in a manner such that dogs or similar animals will be induced to follow a lure such as a rabbit in order to cause the animals to race and it is among the objects of my invention to provide a novel means for supporting the lure in view of the animals and this consists in arranging the mechanism such that a trackway usually employed for supporting the lure may be dispensed with and in place of using but a single lure I have arranged a mechanism in which two or more lures will be employed and to arrange these lures such that they will be visible one at a time in a successive manner.

Another object of my invention is to provide a course on which the animals may be caused to race which may be moved in a direction opposite to the direction in which the animals are traveling in order to reduce the speed of the animals so that a comparatively long race may be run over a relatively short course.

A further object of the invention, ancillary to the foregoing, is to provide a novel means for causing the track to move in the aforementioned direction.

A still further object of the invention is to provide a novel starting arrangement which may be arranged over the track at the start of the race and which may be expeditiously retracted from this position after the race has started in order that the course may be lapped one or more times without interference with the starting apparatus.

A still further object of the invention is to provide in association with the aforementioned starting arrangement starting compartments in which the animals to be raced may be housed which will be arranged in a manner such that they may be expeditiously simultaneously opened in order to release the animals.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a plan elevational view of one form of construction for my invention depicting an arrangement of an elliptical track having two lure members associated therewith;

Fig. 2 is a transverse sectional view taken substantially on the line 2—2 on Fig. 1;

Fig. 3 is an elevational view taken substantially on the line 3—3 on Fig. 1;

Fig. 4 is a fragmental detail view of a modified form of driving arrangement for the mechanisms depicted in Fig. 1;

Fig. 5 is a plan elevational view of a form of my invention as arranged in connection with a circular track having four lure operating members associated therewith and showing my improved starting arrangement associated with such a track;

Fig. 6 is a side elevational view of the starting arrangement depicted in Fig. 5;

Fig. 7 is a transverse sectional view of the devices as depicted in Fig. 5;

Fig. 8 is a fragmental detail view of a clutch arrangement employed in connection with the lure supporting member in the arrangement of the devices as depicted in Fig. 7;

Fig. 9 is a fragmental detail view depicting a section of the track as employed in my device when the same is used in connection with an elliptical track in order to permit expansion thereof as the track member moves around the curved end portions of the track;

Fig. 10 is a plan elevational view of a further modified form of construction for my improved moving track;

Fig. 11 is a transverse sectional view of a modified form of driving connection for my improved track;

Fig. 12 is a view substantially similar to Fig. 11 depicting a further modification of construction;

Fig. 13 is a fragmental detail view depicting a still further modified form of construction for moving my track;

Fig. 14 is a front elevational view of the improved starting box I employ in my device depicting the same with the doors in open position;

Fig. 15 is a perspective detail elevational view of a fragment of my improved starting box showing the means for opening the doors;

Fig. 16 is a transverse sectional view of the device depicted in Fig. 14;

Fig. 17 is a fragmental plan view of the mechanisms depicted in Figs. 14, 15, and 16; and Fig. 18 is a sectional detail view depicting the construction employed for supporting the partitions between the compartments in my improved starting box.

In the accompanying drawings wherein I have illustrated several modified forms for my invention and referring more particularly to Figs. 1 to 3 inclusive 10 indicates a track member that is intended to be surrounded by fences 11 and 12 as will be pointed out more fully hereinafter. The track 10 may be arranged in a manner such that it may be driven in a given direction for a purpose which will also be brought forth and more particularly in the following description. The track indicated by the numeral 10 in the drawings is substantially oval or elliptical in shape having rounded end portions and straightways connecting the semicircular end portions on the corresponding sides of the structure.

Disposed so as to lie within the semicircular end portions of the structure 10 are two disc members 13 and 14 which have studs 15 and 16 depending therefrom that are intended to be journaled in bearing structures 17 and 18. In the present instance I have shown the studs and bearing structures as embodying a so-called plain bearing structure but it is to be understood that antifrictional bearings or other analogous structures may be employed without departing from the purview of my invention. Arranged between the lower side of the plate members 13 and 14 and the upper ends of the bearing structures 17 and 18 are pulleys 19 and 20 which are interconnected by a belt member 21 that is also directed around the pulley 22 on the motor shaft 23 of the motor 24. As is best illustrated in Fig. 1 the motor 24 is disposed in a position such that the pulleys 19, 20 and 22 are arranged in substantially triangular disposition, the pulley 22 being offset from alignment with the pulleys 19 and 20 which of necessity are disposed in alignment. Therefore when power is supplied to the motor 24 and the same is rotated this rotative action of the motor is imparted to the shaft 23 thence to the pulley 22 which acts through the belt 21 to rotate the pulleys 19 and 20 and therefore the rotatable plate members 13 and 14.

Arranged at a predetermined point on the periphery of the plate member 14 is a lure 25. The section of the fence 11 juxtaposed the periphery of the plate members 13 and 14, and disposed in the circular portions of the track members, has an opening, such as that indicated by 26 in Fig. 3, provided therein. It is through this opening 26 that the lure 25 extends during slightly one-half of its revolution in order that it will be disposed over the track 10. On the plate 13 a lure 27 is provided which also extends through an opening 26 in the fence 11 and which is also disposed so as to be above the track 10 during slightly more than one-half of its rotative travel. The lures 25 and 27 are synchronized in a manner such that when one of the lures is above the track the other will be held from view by being on the inwardly disposed portion of the periphery of the plate member on which it is mounted. If the race were to start at the point indicated by 28 the lure 25 would be disposed at a point substantially similar as that indicated by 29. As the animals would be released the plate members 13 and 14 would be set in motion and therefore the lure 25 would eventually move through the opening 26 so as to be held from view by the fence 11 into a position substantially similar to that indicated in Fig. 1. At the time the lure 25 would disappear through the opening 26 in the fence 11 the lure 27 would pass through the other of the openings 26 in the fence 11 into a position above the track 10 and it would therefore attract the attention of the pursuing animals who would then pursue the lure 27 around the semi-circular end portion 30 of the track 10. When the lure 27 would pass into a position in diametrical position to that depicted in Fig. 1 it would pass through the opening 26 in the fence 11 in substantially the same manner as that in which the lure 25 disappeared and at this time the lure 25 would move into position into the track 10 and the dogs would then pursue the lure 25 around the end portion 31 of the track 10 until the lure 25 would again disappear in the manner set forth and obviously the lure 27 would again reappear. In this manner the race might be carried out for any desired number of laps about the track 10 and a suitable finishing point could be arranged on the course at any desired position and after the animals had passed over this finishing line they would be caught by attendants.

In the foregoing description I have described the plates 13 and 14 as being motor driven. However if desired these plates might be manually operated and one manner of accomplishing this is illustrated in Fig. 4 wherein disc members 13a and 14a are shown as having a gear provided on the peripheries thereof. Mounted intermediate the juxtaposed portion of the gears 13a and 14a is a rotatable disc 32 which is mounted on a shaft 33. A pinion 34 is provided on the shaft 33 and this pinion 34 meshes with pinions 35 and 36 which in turn mesh with the gear teeth on the periphery of the plate members 13a and 14a respectively. A handle 37 is provided on the plate member 32 and an operator may grasp this handle and rotate the disc 32 and this rotative movement will be transmitted to the hereinbefore described mechanisms to rotate the discs 13a and 14a.

In the foregoing description I have described the arrangement depicted in Figs. 1 to 4 inclusive, and in Figs. 5 to 13 inclusive I have depicted another arrangement which embodies features some of which are analogous to those disclosed in the preceding figures. As an example of this, in Fig. 5 I depict a substantially circular track 38 which has fences 39 and 40 associated therewith. Arranged at a point on the perimeter of the track 38 is a substantially U-shape supporting structure 41. In this substantially U-shape structure 41 I slidably mount a plate member 42 and at the forward end of the plate member 42 I provide a starting box structure generically indicated by 43 which will be described more fully hereinafter. The plate 42 and the trough 41 are arranged such that the plate 42 might slide out so that the forward end thereof will be positioned above the track 38. The starting box 43 in which the animals will have previously been positioned will then be opened in a manner to be described and the dogs will leap out onto the track 38 and travel in the direction of the arrow 44. The lure 45 is disposed at this time so as to be in view of the animals in the starting box 43. After the animals have been released the plate 42 will be slid back into the trough 41 from a position above the track 38 in order that the animals may be caused to travel around the track a plurality of times, or laps.

In the present instance I have depicted another type of construction for supporting and operating the lure. In this instance I provide in the infield of the track 38 upright posts 46, 47, 48 and 49 which are preferably arranged such that they are disposed at the corners of a square. Pulleys are provided on these posts and a belt 50 extends around the pulleys and when power is supplied to one of the shafts this power is transmitted through the belt 50 to the other of the shafts such that they will rotate simultaneously. As clearly illustrated in Fig. 8, the pulleys, which are indicated in this view by 51, are arranged so as to be freely rotatable on the shafts with which they are associated. Keyed to each of these shafts is a collar 52 which is adapted to be reciprocal along the shaft. Cooperating jaw teeth are formed on adjacent faces of the pulley 51 and the collar 52 and therefore when the collar 52 is moved toward the pulley 51 the teeth on this collar engage the teeth on the pulley 51 and therefore movement imparted to said pulley is transmitted to the shaft and the arrangement is such that any of the shafts may be disconnected.

Carried by the shaft 46 is a horizontally disposed arm 53 which has a supporting member 54 depending from the free end thereof and the lure 45 is connected at the free end of the supporting member 54. In a similar manner a lure 55 is supported by the shaft 47 and a lure 56 is supported by the shaft 48 while a similar lure 57 is supported from the shaft 49. The lures 45, 55, 56 and 57 are adapted to be synchronized in a manner substantially similar to that in which the lures 25 and 27 are synchronized. This arrangement is such that as the lure 45 passes over the fence 40 so as to disappear from view the lure 55 will move into position over the track 38 in view of the animals and similarly when the lure 55 disappears the lure 56 will appear and similarly when the lure 56 disappears the lure 57 will appear and when the lure 57 disappears the lure 45 will reappear. In this manner a lure is held in view of the animals continuously and it is therefore apparent that the dogs may be caused to travel around the circular track 38 any desired number of times.

As has been stated it is sometimes desirable to arrange the track so that it will be movable and preferably so that the track will run in the direction opposite to the course of the dogs or more specifically in a direction opposite to that indicated by the arrow 44 in Fig. 5 which indicates the direction of travel of animals or dogs. In the Fig. 7 I have depicted one arrangement for causing movement of the track 38. In this instance the track is depicted as being mounted in a supporting member 58 and as is clearly apparent from a transverse section of the track. In the construction illustrated in Fig. 7, I preferably arrange the surface of the track so that it tapers inwardly. At spaced apart intervals I provide housings 59 in which axles 60 may be supported. Wheels 61 are provided on the axles 60 and travel on rails 62 that are mounted in the member 63 which in the present instance is shown as being sunk into a pit. In order to impart movement to the track 38 I provide a gear 64 thereon which is adapted to be engaged by a pinion 65 mounted on the shaft of the motor 66. If desired a number of motors such as 66 may be arranged at various intervals around the track so as to drive the same. By varying the speed of the motor 66 the speed at which the track is driven may be varied and therefore the progress of the dogs around the track may be controlled. If desired the motor 66 might be dispensed with and motors might be mounted in the housings 59 which would act on the axles 60 so as to impart movement to the track 38 and if this structure were carried out suitable trolley structures would be mounted in the member 62 so as to supply current to the motors in the housings 59.

In Fig. 11 I have depicted a modified form of construction. In this instance no pit is required and the track 38 is mounted on a bracket 67 so as to be overhung and arms 68 of the brackets 67 carry wheels 69 that travel on the rails 70. In this structure movement might be imparted by having an arm engage the arm 68 which would be driven, from a source of power interiorly of the track or a motor such as 66 might be employed to engage a gear mounted on the bracket 67.

In Fig. 12 I have depicted a structure in which rails 71 are mounted on the surface of the ground and an axle 72 having wheels 73 thereon might be arranged to travel on these rails 71 and in this instance movement might be imparted from a source of power similar to that indicated in Fig. 7 which centers around the motor 66.

In Fig. 10 I have depicted a modified form of construction. In this instance two circular track members 74 and 75 are provided and parallel track ways 76 and 77 extend from diametrically opposed points on the members 74 and 75 so as to interconnect the circular track ways. The circular track ways 75 and 74 are intended to be revolved in a manner heretofore set forth while the parallel track ways 76 and 77 are intended to be stationary. It is therefore apparent that animals racing around such a track structure would move along the straightway portion in the normal manner but their progress might be slowed down during travel around the circular end portions.

However, if desired the circular end portions might be arranged to be merely guide ways and a stationary belt-like structure might be arranged to extend there-around. As shown in Fig. 13 axle structures 78 might be associated with the under side of this track on which wheels 79 might be provided and adapted to travel on rails 80, movement to be imparted to this structure in any of the manners hereintofore described. In order to facilitate passage of such a structure around the circular end portions and also to permit proper movement thereof along the straightway portions the track in this instance would be constructed in the manner depicted in Fig. 9. As shown herein the rack consists of a plurality of slabs 81 arranged in over-lapping relation and are pivotally connected together adjacent the periphery thereof as indicated at 82. As such a structure as this passed around the circular trackways 74 and 75 the slabs 81 would fan out and when the straightway portions were approached these slabs would move back into normal position.

In Figs. 14 to 18 inclusively I have depicted the starting box 43 and as clearly shown in these views my improved starting box consists of spaced apart parallel members 83 and 84 which constitute the top and bottom thereof. End plates 85 and 86 are arranged at the ends of the parallel members 83 and 84. At spaced apart intervals partition structures consisting of the interconnected members 87 and 88 would be disposed and these members 87 and 88 will be interconnected by the members 89 which would carry suitable bolt members 90 that could be extended through openings in the members 83 and 84 and be engaged by nut members 91 so as to form a structure which might easily be collapsed when so desired. On the end members 85 and 86 I provide a handle structure such as that indicated by 92 so as to facilitate transportation of the starting box 43.

It is apparent that the partitions 87 and 88 define a plurality of parallelly extending compartments 93 which are adapted rear ends thereof closed by the sliding doors 94 slidably mounted in the U-shaped guide ways 95. The forward ends of the compartments 93 are closed by vertically extending doors 96 and 97 which are hingedly mounted in position by hinges such as 98 and which in the present instance are intended to open away from the vertical center line of the compartments 93. Mounted on the doors 96 and 97 are vertically extending bars 99 which are disposed adjacent the co-operating edges of these doors. Links 100 are pivotally connected to the foot portions 101 of the upper ends of the arms 11 and these links have their opposite ends thereof connected to the bar 102. Guide strips 103 are mounted on the outer side of the member 83 and the ends of the bar 102 have rollers 104 mounted thereon which travel in these guide strips 103. It is therefore apparent that the bar 102 may be reciprocated across the outer surface of the member 83 guide strips 104 being provided to facilitate this movement.

Connected to the upper side of the member 83 are bar members such as 105 which extend through sleeves 106 that are connected to the bar 102. The rods 105 have headed ends 107 and suitable coil springs 108 are disposed around the bars 105 between one end of the sleeve 106 and the headed end 107 and these springs act on the sleeves 106 to normally hold the doors 96 and 97 in open position. Connected to the bar 102 at spaced apart intervals are operating bars 109 which have offset portions 110 provided therein which constitute a latch for when the handle portions 110 of the operating bars 109 are grasped and the bars 109 are moved rearwardly so as to close the doors 98 and 99, the offset portion 110 is moved into latching relation with the member 111 and thus the doors are held in closed position against the action of the springs 108. When the offset portions 110 are released from the latch members 111 the springs 108 act to quickly move the doors into the position depicted best in Fig. 17 and the animals confined in the compartments 93 are permitted to escape to pursue the lures in a manner herebefore set forth.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In animal racing apparatus, an endless trackway rotatable in a horizontal plane and providing a surface over which animals may run, a supporting bed, an endless track of rails on said bed and in a common horizontal plane, rotatable means on said trackway movable over said rails, and means for imparting movement to said rotatable means to move said trackway over said rails.

2. In animal racing apparatus, a trackway adapted to travel in a substantially elliptical path and providing a surface over which animals may run, said trackway comprising a plurality of overlapping sections pivotally interconnected to each other at their inner ends, means for supporting said trackway, and means for imparting movement to said trackway whereby said sections, normally parallel to each other, will spread in fan-like formation as the trackway moves about the curved portions of its path.

3. In animal racing apparatus a trackway providing a surface over which animals may run, a rail adjacent one side of said trackway, rotatable means movable along said rail, and brackets carried by said rotatable means for supporting said trackway whereby movement imparted to said rotatable means will carry said trackway therewith on said brackets.

In testimony whereof I affix my signature.

ELMER L. BALLEW.